United States Patent [19]

Norbury, Jr. et al.

[11] Patent Number: 5,397,950

[45] Date of Patent: Mar. 14, 1995

[54] ISOLATION MOTOR MOUNT AND GASKET

[75] Inventors: Raymond L. Norbury, Jr., Dallas; Jerry N. Morgan, Mesquite, both of Tex.

[73] Assignee: Cary Products Co., Inc., Hutchins, Tex.

[21] Appl. No.: 173,665

[22] Filed: Dec. 23, 1993

[51] Int. Cl.$^6$ .................. H02K 5/00; H02K 5/24; H02K 9/00

[52] U.S. Cl. .................. 310/91; 310/51; 310/58; 310/89

[58] Field of Search .................. 310/51, 91, 58, 89; 277/97, 173, 177, DIG. 9; 248/609, 613, 634, 635, 638, 671, 672

[56] References Cited

U.S. PATENT DOCUMENTS

| | | | |
|---|---|---|---|
| 1,284,267 | 11/1918 | Eaton | 310/91 |
| 1,866,154 | 7/1932 | Eli | 248/638 |
| 2,632,861 | 3/1953 | Morton et al. | 310/258 |
| 3,143,284 | 8/1964 | Lindsjo et al. | 310/51 |
| 3,323,763 | 6/1967 | Butts | 310/91 |
| 3,509,393 | 4/1970 | Roddy | 310/51 |
| 4,171,190 | 10/1979 | Hudson | 417/350 |
| 4,676,473 | 6/1987 | Giles | 248/638 |
| 5,040,764 | 8/1991 | Dubois | 248/635 |
| 5,104,271 | 4/1992 | Lechler | 248/635 |
| 5,177,858 | 1/1993 | Jones | 310/91 |
| 5,230,612 | 7/1993 | Murphy | 417/350 |

FOREIGN PATENT DOCUMENTS

| | | | |
|---|---|---|---|
| 102879 | 11/1963 | Norway | 248/609 |
| 220405 | 5/1968 | Sweden | 248/609 |

*Primary Examiner*—Steven L. Stephan
*Assistant Examiner*—Clayton E. LaBalle
*Attorney, Agent, or Firm*—T. D. Copeland

[57] ABSTRACT

An electric motor mounting arrangement is disclosed which permits the motor to "float" within a blower housing without requiring any direct contact between the housing and the casing of the motor. This is possible because of the employment of a rubber-like gasket that supports the motor within the housing, so that only the flexible gasket makes contact with the motor. This unique gasket also provides an air space to permit air flow around the motor for heat ventilation, due to a plurality of ribs, nodes or bumps that create the air space, and in one environment, due partially to a series of aligned air slots in both the gasket and in the blower housing. The gasket together with a design configuration including spacing means prevents both halves of the motor housing from touching the motor casing, or each other, except thru a selectively dimensioned spacing means.

11 Claims, 5 Drawing Sheets

ISOLATION MOTOR MOUNT AND GASKET

BACKGROUND OF THE INVENTION

1. Field of Invention

This invention relates to electric motor mounting arrangements and vibration and noise isolation gaskets therefor.

2. Prior Art

The following patents, and the references cited therein, comprise part of the prior art:

U.S. Pat. No. 1,855,769, issued Apr. 26, 1932, to C. R. Paton, for Motor Support, discloses serrations, or ribs 27, in a rubber like support in the mounting structure; however, these ribs are not used for air ventillation, and are intended to age and increase their area of contact with their mounting surface.

U.S. Pat. No. 3,455,525, issued Jul. 15, 1969, to H. Waermo, for Vibration Reducing Support Element, shows a rubber disk, that provides flexible support for a framework attachment.

U.S. Pat. No. 4,171,190, issued Oct. 16, 1979, to J. Hudson, for Blower Motor Mounting Assembly, utilizes a pair of spaced rubber-like material supports that utilize the external end walls attached to the motor end walls for their support.

U.S. Pat. No. 4,676,473, issued Jun. 30, 1987, to W. Giles, for Compressor Mounting Bracket, discloses a metal band mounting strip with an inner liner of padding to snugly engage the exterior of the compressor, while the bracket is attached to the housing unit, to thus reduce vibration when the compressor is operating.

U.S. Pat. No. 5,230,612, issued Jul. 27, 1993, to T. Murphy, for Motor Mount for Blower Housing, incorporates a flat smooth rubber material gasket that encircles a motor housing and it and the motor are clamped in place in such a manner that both the gasket and arcuate housing members are required to bind the motor in place and prevent sliding.

SUMMARY OF THE INVENTION

A primary object of this invention is to provide a motor mount isolation gasket that will hold an electric motor between a top blower housing mount and a bottom blower housing mount when assembled and without allowing any part of the top or bottom blower housing to contact the motor case per se, when assembled.

Another object is to provide a gasket of this type which will reduce noise transmission from the motor to the blower housing unit by eliminating any direct contact between the motor and the blower housing unit, which will permit the motor to "float" between compressible gasket members.

A further object is to provide an isolation gasket as described that is made of thermoplastic elastomers, which is injection molded to any desired size and shape to include a plurality of ribs, or a series of nodes, to provide an air space, when desired or required, between the motor and the gasket to permit heat ventillation from the motor where such heat is generated.

And yet another object of this invention is to provide for increased heat ventillation as desired by the incorporation of air slots in the top and bottom portions of the blower housings, and to additionally provide for air slots in the gasket membranes, which slots correspond in size, shape and location with the slots in the blower housings.

A still further object is to provide for a motor mount arrangement, wherein the available space for air circulation and for heat removal capacity may be increased by increasing the height of the ribs and/or the size of the air slots.

And another object is to provide for such a motor mount arrangement as above described, that also possesses a flexibility in accommodating various motor encasement diameters, as well as irregularities in the motor's peripheral surface.

Another important object is the provision of a specifically configured nipple projecting from the side of the gasket away from the motor, whereby the gasket may be held in place with or without the need for retaining well in the blower housing to accommodate the gasket.

A further object is to provide flange means at the sides of the gasket which will also remove the need for a gasket holding well.

These and other objects and advantages will be apparent from an examination of the following specification and drawing, from which it will be observed that noise and vibration have been isolated, while improved heat dissipation has been provided for.

DESCRIPTION OF THE PREFERRED EMBODIMENTS

Figure 1:
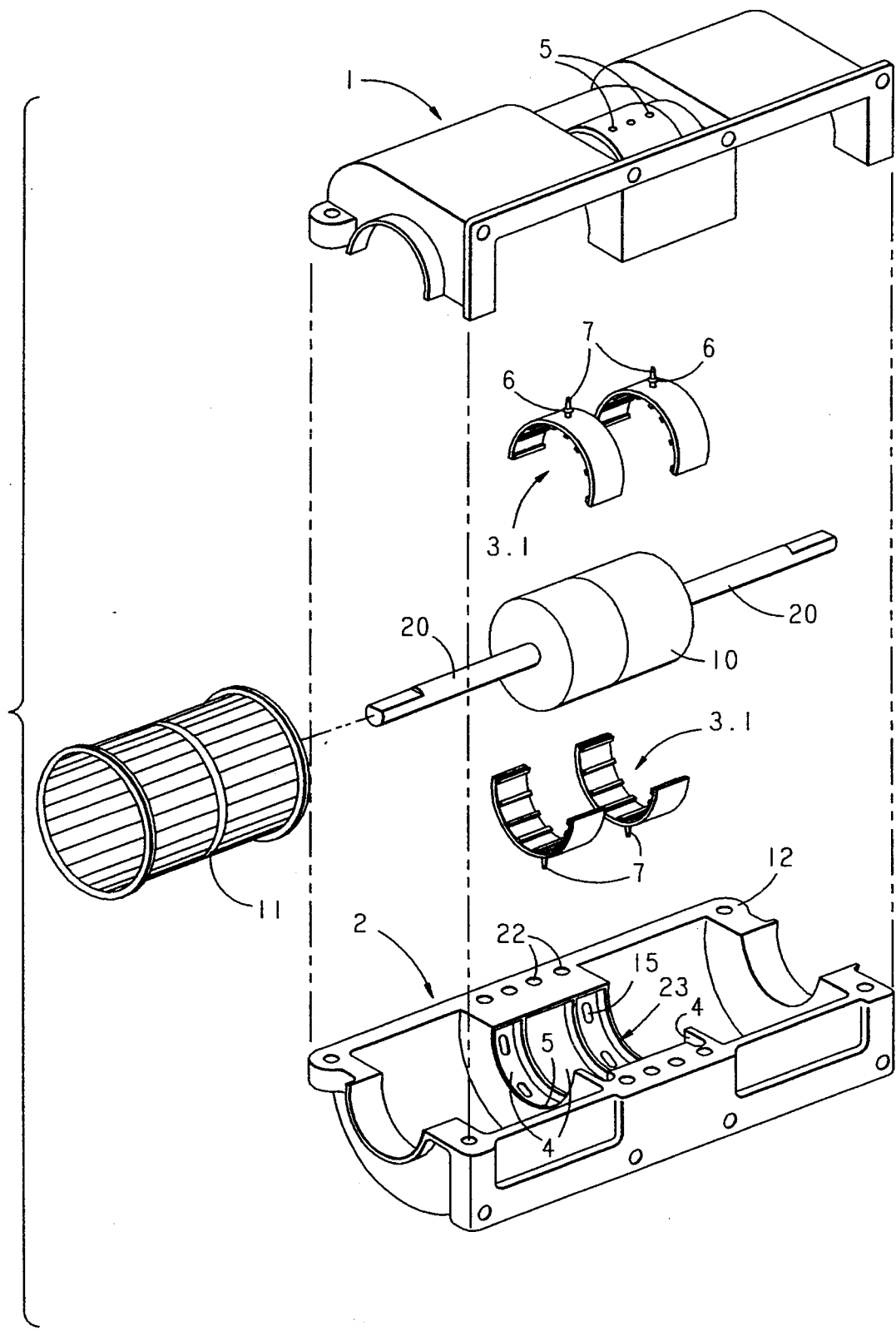
FIG. 1 is an exploded view of the blower housing, showing one blower wheel, the blower motor, mounting gaskets, and relating housing structure.

Referring now more particularly to the characters of reference in the drawing, it will be seen that the plastic blower housing of FIG. 1, comprises a top blower housing 1, and a bottom blower housing 2, which enclose, when joined, a pair of blower wheels 11, and an electric motor 10 with shaft 20 to engage and rotate the blower wheel 11 of the air conditioning and/or heating circulation system, of which this blower is a part.

An important element of this invention is the rubberized thermoplastic motor mount isolation gasket 3 as shown in FIGS. 1, 2, 4 and 5, and at 3.1, et al, as shown in FIGS. 6, 7, 8, 9 and 10–14. This gasket, sometimes called a "grommet", may be made from a material produced by Shell Chemical Co., and identified by the trademark "Kraton", and the part number G2705. Other similar materials may be used, and their color may be clear, cloudy, or otherwise.

Figure 4:
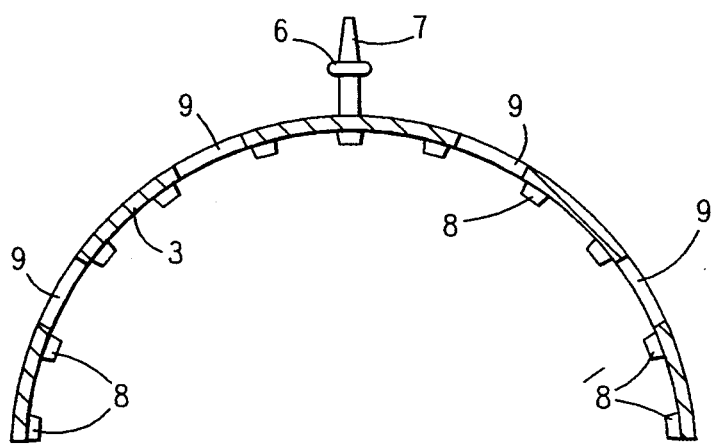
FIG. 4 is a sectional view of the gasket of FIG. 2 curved in the manner it would be at the time of installation.
Figure 5:
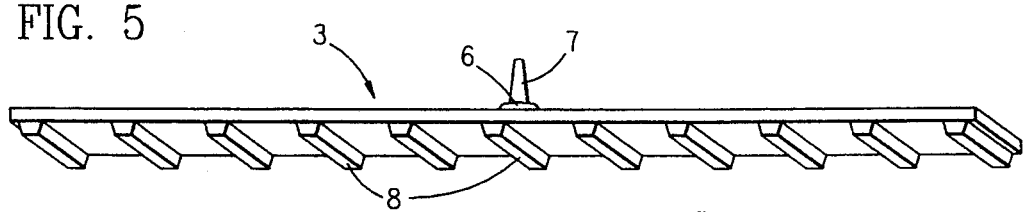
FIG. 5 is a perspective view of the gasket of FIGS. 2 and 4, laid out flat.
Figure 6:
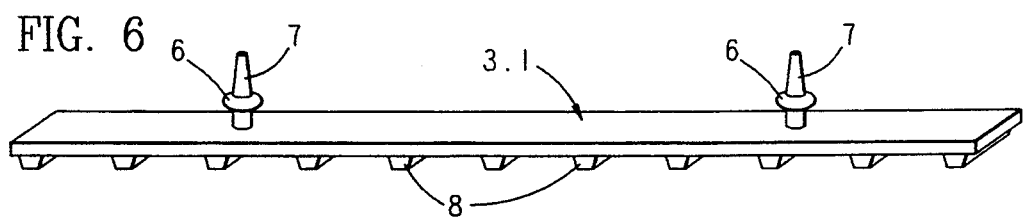
FIG. 6 is a perspective view of the back side of a modified version of the gasket of FIGS. 4 and 5, showing the option of two mounting nipples.

Reference to gasket 3 throughout this specification will identify all of the gaskets used in a generic sense, and to the specific gasket in FIGS. 4 and 5. Other specific embodiments of gasket 3, are identified as 3.1, 3.2, 3.3, and 3.4 as shown and described herein.

Figure 2:
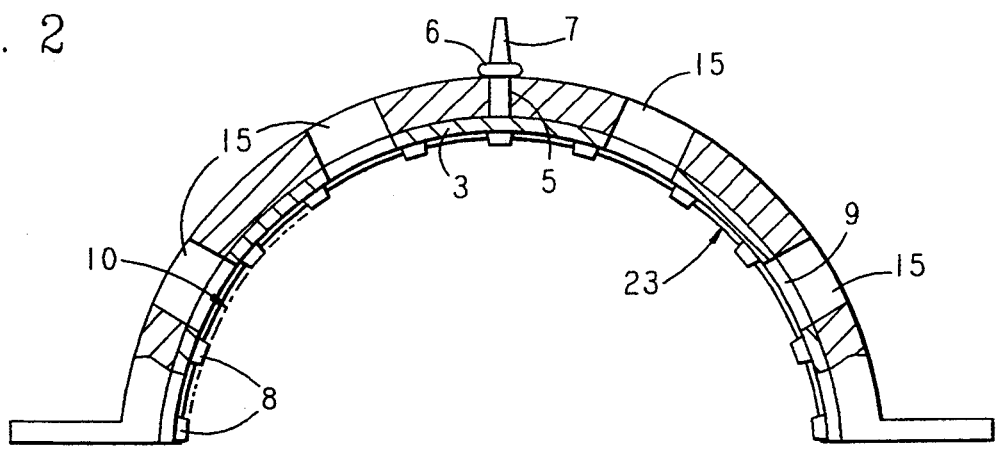
FIG. 2 is a sectional detached view through a mounting surface of the top housing with the gasket attached.
Figure 3:
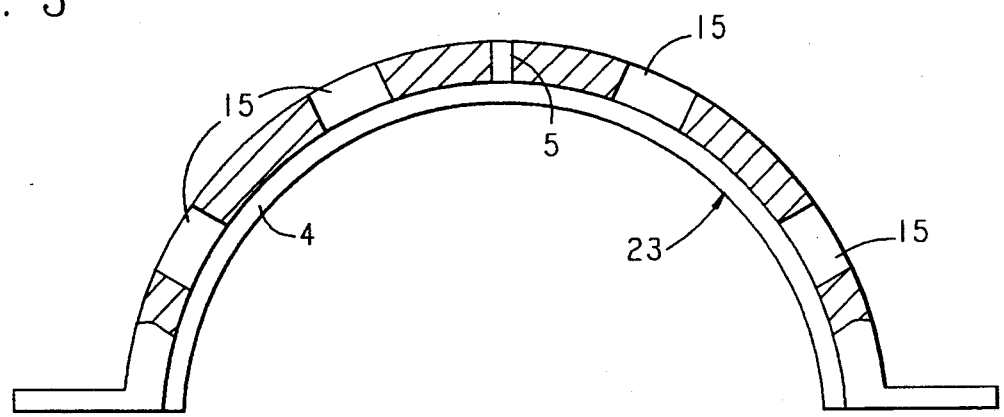
FIG. 3 is the mounting surface of FIG. 2 without the gasket attached.

In FIGS. 1 and 2 it will be seen that the gasket 3 surrounds the casing of the motor 10, with the ribs 8 touching and supporting the motor, and with the backside of the gasket residing in a holding well 4 which is provided in both the top blower housing 1 and the bottom blower housing 2, as one preferred method of installation. The use of this motor mount isolation gasket will help reduce noise transmission from the motor to the blower housing by eliminating direct contact between the motor 10 and blower housing body 1 and 2, and in effect permitting this motor 10 to "float" within the compressible gaskets 3.

Figure 7:
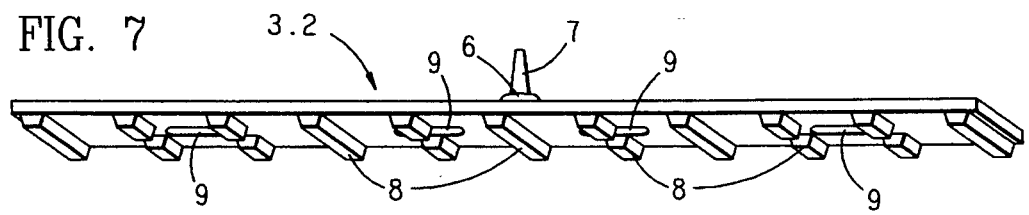
FIG. 7 is a front perspective view of a wide version of a gasket similar to that shown in FIG. 5, which has been modified to include air slots.
Figure 8:
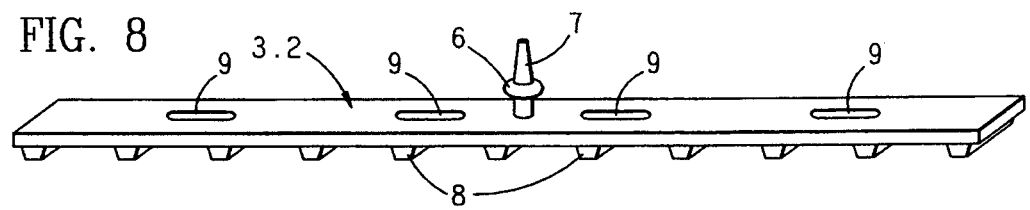
FIG. 8 is a back side perspective view of the gasket of FIG. 7.
Figure 9:
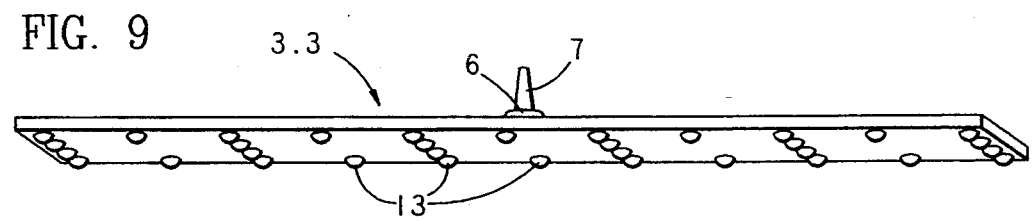
FIG. 9 is similar to the gasket of FIG. 5, but which has been modified to include nodes in place of ribs on its front surface.

The gasket, per se, may be injection molded to any desired size and shape to include ribs 8 of FIGS. 2, 4 and 5, or a series of protuberances 13 of FIG. 9, and with or without air slots 9 of FIGS. 7 and 8, which correspond in size and location with the corresponding slots 15 in both top and bottom blower housing 1 and 2, to permit air circulation and heat ventillation when the blower housing is fully assembled and in operation.

The ribs 8 and nodes 13, when compressed by assembly fasteners 21 (of FIG. 12), grip the motor casing and hold the motor 10 firmly in place. These ribs 8 and nodes 13 also allow air circulation and heat ventillation from the motor surface to exit from the assembled blower housing H, around the lateral edges 23, after having been drawn in thru air slots 15 in the blower housing structure. The slots 9 will register with housing slots 15 when gasket 3.2 is employed in the centermost holding well 4; however, the slots 15 will assist in the air and heat circulation even when gasket 3.1 is used and is seated in the endmost recess wells 4.

Figure 12:
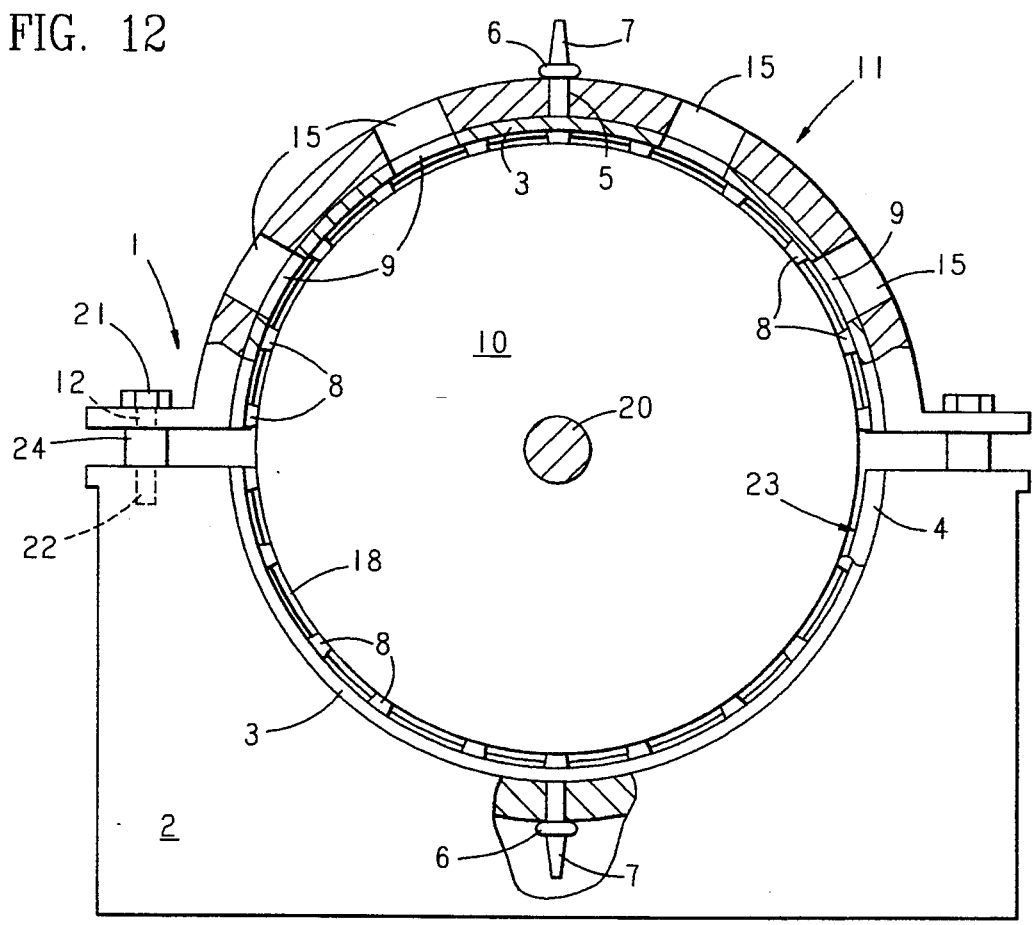
FIG. 12 is a cross sectional view through the attaching members and holding gaskets after installation.

Additional ventillation may be achieved by increasing the height of the ribs 8 or nodes 13, and reducing the amount of compression applied to the gasket 3 by the application of force to the fasteners 21 of FIG. 12. It will also be noted that with this installation, it is impossible to ever permit tightening the fasteners 21 sufficiently to cause contact of the housing metal or plastic with the motor 10, because of predesign clearance spacer 24 between the top blower housing 1 and the bottom blower housing 2, as seen in FIG. 12. This construction will also allow the motor mount isolation gasket 3 to grip different motor 10 encasement diameters as well as accommodate irregularities in the motor's circumference.

The gaskets of this invention include a tapered rubberized nipple 7 with an oversized round nipple locking ring or shoulder 6, which are each molded into the gasket upon manufacture. This nipple and ring holds the gasket 3 in place in the blower housing whether within recess well 4 or merely on a curved surface with no end flanges (23 of FIG. 1). The gasket is mounted into the well or on the surface by pulling the free end of the nipple 7 through a corresponding gasket holding hole 5 until the ring 6, which is slightly larger in diameter than the hole 5, and the rest of nipple 7 has passed completely through the hole 5, whereat the gasket is locked in place, as shown in FIG. 2. The tapered nipple 7 is designed to be long enough to allow it to be pulled through the wall of the blower housing by grasping it with bare fingers, or with a mechanical device for this purpose. Once the nipple tip and locking ring 6 are completely through the housing wall, the ring can again expand and lock the gasket in place in the recess well or flat mounting surface. One or more of the molded nipples are included with each gasket part as desired.

Another embodiment, 3.4, of the motor mount isolation gasket (shown in FIG. 10) is molded with a flange 14 along each edge of the gasket membrane, so that the lip or flange 14 can be molded without the option of the nipple 7 feature, and is used to align the edge of the housing wall or the outside edge of a raised platform to provide another assembly in which it is impossible for the blower housing to come into contact with the motor casing, or with the other half of a complete blower housing assembly. The notches 16 permit the gasket 3.4 to be conveniently used on different sized and contoured housings. Also, gasket 3.4 can be made and used without the option of the nipple 7 feature.

Figure 11:
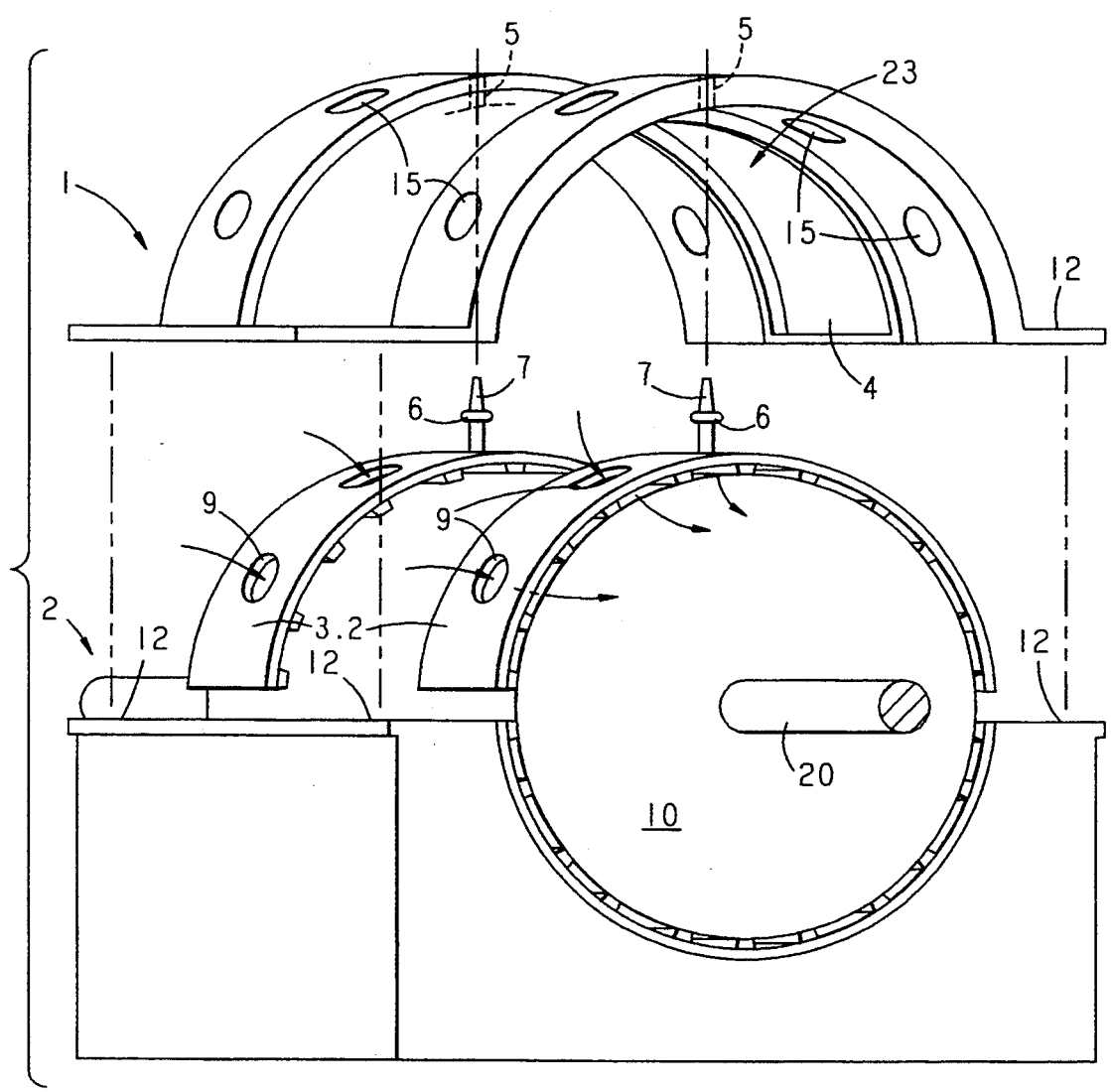
FIG. 11 is a perspective exploded view of the gasket and attaching members showing the air ventilation paths.

FIG. 11 shows one mode of the air flow during operation of the motor and blower of this invention. With the air slots 9 of the gasket 3.2 in alignment with the air slots 15 of the blower housing (1, 2), the external air, by the blower wheel 11 rotating, is sucked into the openings 15 and 9 and is then exited from the gasket area by the openings 18 between ribs 8, past the motor 10 and out to the atmosphere.

Referring to FIG. 12, a partial section through the mounting arrangement of this invention, shows that the housing 1 compresses the gasket 3.2 against the motor 10 when the fasteners 21 are tightened into fastener hole 12 of the housing 2, but that the flanged arcuate edge 23 of the housings can never contact the motor 10 because the predesign clearance prevents such contact, and the thickness of gasket 3 is always greater than the depth of edge 23 of either housing, leaving air circulation space 18 for heat ventillation and air flow.

Figure 13:
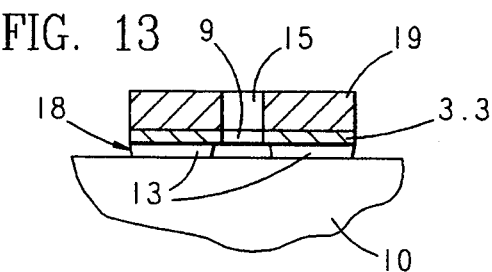
FIG. 13 is a detail section of another embodiment employing a separate mounting ring and the gasket of FIG. 9, installed in a holding mode over a motor.

FIG. 13 shows another embodiment of the mounting arrangement of this invention, in which a metal or other material ring 19 surrounds and supports the motor 10, by utilizing the flexible, compressible rubber-like gasket 3.3 between mounting ring 19 and the motor 10. FIG. 13 is a cross section through the mount 19 and gasket 3.3 at the vicinity of the aligned air slots 9 and 15 of the gasket 3.3 and mount 19 respectively. Neither this or the other embodiments disclosed and claimed herein, are limited to a blower housing, but may be used where appropriate wherever a motor mounting is required wherein it is required that the motor mount ring or housing does not touch the motor after installation, as required by the aforementioned Murphy patent. Also upon installation, an air circulation space remains between the motor 10 and the body of the gasket 3.3, by virtue of the nodes 13, and the degree of compression imposed on the gasket by virtue of the mounting ring. Heat ventillation and air flow circulation occur thru the aligned air slots 15 and 9 and the air circulation space 18.

Figure 10:
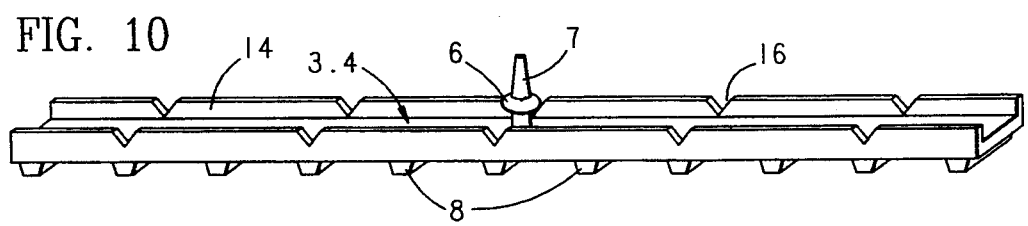
FIG. 10 is a modified embodiment of the gasket of FIGS. 5, 7 or 9, having edgewise mounting flanges.
Figure 14:
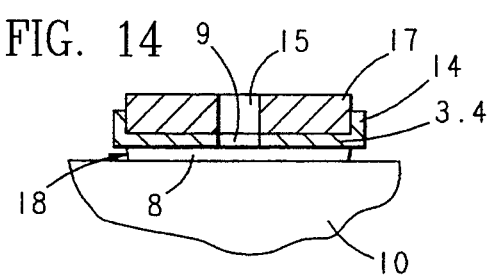
FIG. 14 is a detail view similar to FIG. 13, using the gasket embodiment of FIG. 10.

FIG. 14 is a view similar to FIG. 13, of another embodiment of the motor mounting arrangement and gasket of this invention, in which the gasket employed is that shown in FIG. 10, as 3.4, and which gasket includes right angle flanges 14 at each side of the main body of the gasket to engage the lateral edges of the mounting platform 17 which supports motor 10 in a manner to permit the motor to "float" within the confines of the diameter of closed circular platform 17. Gasket 3.4 is compressed into holding relation with motor 10, but being flexible, it permits motor 10 to "float", while still providing air circulation space 18 which connects with air slots 9 and 15 in the gasket and mounting platform 17, notwithstanding a partial compression of ribs 8.

Figure 15:
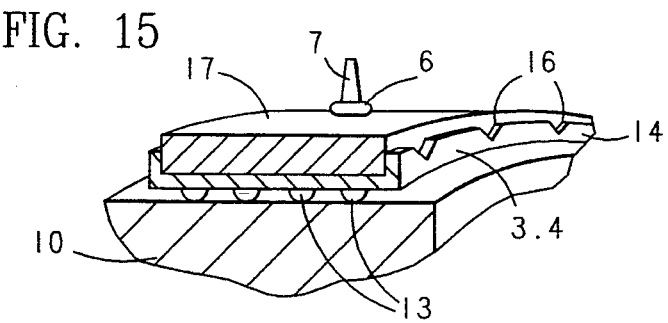
FIG. 15 is a fragmentary perspective view of the mounting arrangement of FIG. 14.

FIG. 15 is a perspective view of the embodiment of FIG. 14, showing the mounting of gasket 3.4 to platform 17 by means of locking ring 6 of nipple 7. This view also shows the advantage and necessity of the notches 16 in the lateral edge flanges 14 of gasket 3.4, whereby the flanges 14 of gasket 3.4 are permitted to follow the contour of the motor casing, so that gasket 3.4 can function in the manner intended.

While the present invention is described in connection with the preferred embodiments thereof, it should be apparent that other embodiments may be utilized in keeping with the spirit and scope of the present invention that is defined by the appended claims.

What is claimed is:

1. A non-metallic compressible gasket for insertion between a motor and a motor mount to permit the motor to float in a controlled range in said motor mount, comprising a flexible membrane having a body and a plurality of raised projections on the side of said gasket abutting said motor and spaces between said raised projections defining air flow passages between said motor and said projections, and a plurality of air slots aligned in both said gasket and said motor mount to permit air passage from the atmosphere through said motor mount and through said gasket and between said gasket and said motor back to the atmosphere to provide a heat ventilation airflow for said motor.

2. A gasket as in claim 1 having a main body portion with projections on the side facing the motor, and including a perpendicular projecting mass of gasket material on the side of the gasket to engage the motor mount for locking said gasket to the motor mount in such a manner that no part of said motor mount can contact any part of said motor during operation of the motor.

3. A gasket as in claim 2, wherein said mass comprises a tapered nipple having a locking ring thereon, and wherein said ring is spaced from said body portion of said gasket a distance substantially equal to the thickness of said motor mount to permit said ring to lock said gasket in secure relation with said motor mount.

4. A gasket as in claim 1, comprising flange edges along the sides of said gasket and having notches in said edges to accommodate curvature of said gasket.

5. A gasket as in claim 1, wherein said projections are selected from a group comprising ribs, nodes and bumps.

6. A gasket in use between a motor mount and a motor to permit air ventilation, heat dissipation, and noise and vibration isolation, comprising in combination:

a. a top housing and a bottom housing in said motor mount, each having aligned fastener openings and having a motor cavity therebetween which surrounds and partially encloses said motor,
   b. a non-metallic, rubber-like, flexible, compressible gasket between said motor and each of said housings wherein said motor floats in a controlled range between said housings without ever touching either housing,
   c. wherein said gasket is so constructed as to form an air flow passage between said motor and said gasket,
   d. and wherein a spacer is included between said aligned fastener openings to prevent said separate housings from contacting each other or said motor, and to assure the continued existence of said air flow passage.

7. A gasket and a motor mount as in claim 13, wherein air flow slots are provided in an aligned relationship in each of the housings and each of the gaskets.

8. A motor mount for receiving a gasket comprising a separable housing, each of which includes at least one recess well defining a locking hole to receive at least one gasket having a locking ring and nipple projecting from the side of the gasket adjacent said housing, and wherein the length of said nipple projecting through said locking hole is sufficient to provide a hand grip to permit said nipple and locking ring to be manually pulled through said hole and locked on the back side of said housing to hold said gasket securely in place.

9. A motor mount for receiving a gasket, as in claim 8, wherein said top and bottom housings comprise spacer means between said housings, whereby said housings cannot be tightened sufficiently to compress said gasket enough to permit either housing to touch said motors, and wherein said motor extends beyond said motor mount.

10. A motor mount for receiving a gasket as in claim 8, wherein the gasket further comprising at least one raised nipple on the side of said gasket abutting said housing and projecting through said locking hole and including means for locking said gasket in said housing.

11. A motor mount for receiving a gasket as in claim 10, wherein said means comprises a locking ring on said nipple spaced from the body of said gasket a distance approximately equal to the thickness of said housing in the area of said nipple.

* * * * *